No. 658,039. Patented Sept. 18, 1900.
A. A. LOW.
SAP PAIL COVER.
(Application filed Nov. 7, 1899.)
(No Model.)
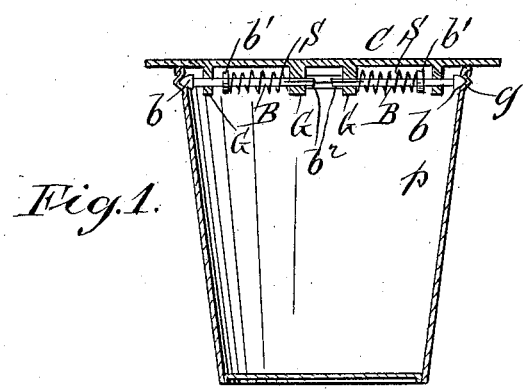
Fig. 1.
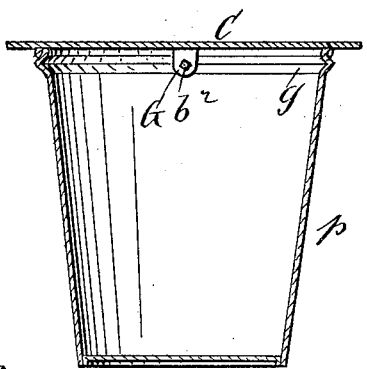
Fig. 2.
Fig. 3. Fig. 4.
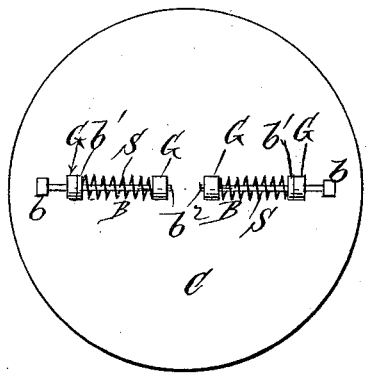 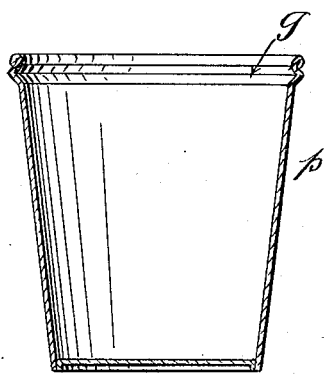
Witnesses:
Inventor:
Abbot Augustus Low
By his Attorney
George William Miatt
THE NORRIS PETERS CO., PHOTO-LITHO., WASHINGTON, D. C.

UNITED STATES PATENT OFFICE.

ABBOT AUGUSTUS LOW, OF NEW YORK, N. Y.

SAP-PAIL COVER.

SPECIFICATION forming part of Letters Patent No. 658,039, dated September 18, 1900.

Application filed November 7, 1899. Serial No. 736,087. (No model.)

*To all whom it may concern:*

Be it known that I, ABBOT AUGUSTUS LOW, a citizen of the United States, residing in the city of New York, borough of Brooklyn, in the county of Kings and State of New York, have invented certain new and useful Improvements in Sap-Pail Covers, of which the following is a specification sufficient to enable others skilled in the art to which the invention appertains to make and use the same.

My invention relates to pails used in the collection of sap from trees; and it consists in the special construction and arrangement of parts hereinafter described and claimed.

In the accompanying drawings, Figure 1 is a vertical central section of the pail with the cover applied thereto; Fig. 2, a similar view taken on a plane at right angles to Fig. 1; Fig. 3, a view of the under side of the cover; Fig. 4, a view similar to Figs. 1 and 2 without the cover.

The pail $p$ is preferably, though not necessarily, made of sheet metal, with the internal annular groove $g$ near its rim or edge spun or otherwise formed to afford a recess or depression at all points of the circumference for engagement with the bearings $b\ b$ of the spring-bolts B upon the under side of the cover C, which latter is substantially the same in construction and operation as that shown and described in my said concurrent application for patent. Thus each spring-bolt B rests in guides G G and is provided with a shoulder $b'$, between which and one of the guides G is interposed a spring S, which tends constantly to throw the bearing $b$ into engagement with the groove $g$ and maintain it therein when the cover is forced down upon the edges of the pail. The shank $b^2$ of each bolt B is prevented from turning upon its longitudinal axis by making said shank square in cross-section and by making the engaging holes in the guides G to correspond, or the same result may be attained by any other well-known mechanical expedient.

In applying the cover C one of the bearings $b$ is brought into engagement with any portion of the annular groove $g$, the spring allowing the bolt to be forced back sufficiently to admit of the depression of the cover until the other bearing $b$ is likewise brought into engagement with the internal groove $g$, when the cover is practically locked rigidly in position, but not sufficiently so to prevent its intentional displacement by pressure applied to raise the lid on one side, and thereby free the bearings $b\ b$ from the groove $g$. The sides of the groove $g$ and the bearings $b\ b$ are sufficiently inclined to act as wedge or cam surfaces, which while they insure frictional contact do not positively lock the parts nor prevent the bearings from sliding out of the groove $g$ when sufficient pressure is applied to the cover externally.

What I claim as my invention, and desire to secure by Letters Patent, is—

The combination of the pail $p$, formed with the annular groove $g$, having inclined sides, the cover C formed with the guides G, G, the bolts B, B, having the cam-shaped bearings $b$, $b$, square shanks $b^2$, $b^2$, and shoulders $b'$, $b'$, and the springs S, the whole arranged and operating substantially as herein shown and described.

ABBOT AUGUSTUS LOW.

Witnesses:
D. W. GARDNER,
GEO. WM. MIATT.